June 17, 1952

J. S. SWEARINGEN 2,601,009

METHOD OF LOW-TEMPERATURE SEPARATION
OF GASES INTO CONSTITUENTS

Filed Dec. 1, 1949

Judson S. Swearingen
INVENTOR.

BY Browning & Simms

ATTORNEYS

Patented June 17, 1952

2,601,009

UNITED STATES PATENT OFFICE 2,601,009

METHOD OF LOW-TEMPERATURE SEPARATION OF GASES INTO CONSTITUENTS

Judson S. Swearingen, San Antonio, Tex., assignor to Institute of Inventive Research, San Antonio, Tex., a trust estate of Texas Application December 1, 1949, Serial No. 130,398

10 Claims. (Cl. 62—175.5)

This invention relates to improvements in method and apparatus of low temperature separation of mixtures of gases and refers more particularly to a selective separation of the higher molecular weight constituents from a mixture of hydrocarbon gases to obtain substantially quantitative recovery of the heavy constituents at a reasonable cost.

At the present time the recovery of the high molecular weight constituents of hydrocarbon gases is commercially obtained by absorption or adsorption methods. Both these methods involve the removal and purification of the absorbed or adsorbed constituents and the reconditioning and reuse of the absorbent or adsorbent. These separation methods are expensive, require heavy investment in apparatus, and the separation is not especially sharp. This lack of sharpness necessitates the use of purification apparatus and leaves on hand for disposal a low-pressure residue gas removed from the product.

Low temperature methods are in commercial use for separation of air and other gases, but have not been found especially useful in the separation of gas mixtures such as natural gas containing methane, ethane, propane, butanes, and even higher molecular weight hydrocarbons. The usual low temperature fractionation operation is difficult to perform for separating hydrocarbons at a reasonable cost because of the extreme temperature range through which the operation must take place. For example, the stabilized liquid product, containing the heavier constituents, will sometimes have a temperature of about 300° F. and even higher while the light constituents or overhead product may be recovered at a temperature of about —65° F. or even lower.

The primary object of this invention is to provide a method and apparatus whereby a gaseous mixture may be separated into its heavier and lighter constituents by low temperature fractionation with requirement for less refrigeration than has been required by previously known methods and apparatus.

The present invention accomplishes this object by first separating from the feed stream of gaseous mixture a portion of its heavier constituents in liquid form, then performing the major separating step by partial condensation and fractionation at low temperatures, then warming and flashing the liquid product of the principal separation step and contacting the vapor therefrom countercurrently with the initially separated liquid from the feed stream, whereby a substantial portion of the desirable fractions carried in the vapor resulting from the flashing of the liquid product will be exchanged for undesirable lighter constituents of the initially separated liquid fraction. If the liquid product is to be stabilized, the saving in refrigeration can be still further increased by cooling the overhead gases from the stabilizer to condense a substantial portion of the heavier constituents therein and causing the condensed portion to mingle with, augment and be processed with the liquid resulting from the initial separating step as it flows countercurrently to the vapors in the manner above stated.

In another form of my invention the above mentioned step of flashing the liquid product of the principal separation step is carried out at a temperature intermediate the cold fractionation temperature and the warm first separation temperature. This flash gas being liberated at a temperature well below that of the first separation step would be leaner in desired constituents than the gas in equilibrium with the first separated liquid so that nothing would be gained by contacting these two streams in the fractionator. Hence it may be passed back into the incoming first separated gas stream, preferably at a point where the temperatures of the two streams match. The flash temperature being lower than that of the first separation step, additional flash gas will be obtained when the flash liquid is raised in temperature to that of the first separation step, and there would be an advantage in contacting this portion of the gas in the fractionator with the first separation liquid. If instead of a single intermediate temperature flash separation several successive stages of flash separations in series at successively higher temperatures were used the total amount of the desired constituents in the composite flash gas streams would be low and the use of the fractionator as far as the flash gas is concerned would be virtually unnecessary. These various flash gas streams could be collected and injected at a single point into the first separation gas, preferably at a point where the temperatures match, or they could be introduced separately into the first separation gas stream, preferably at points where the respective temperatures match.

Another object is to provide apparatus and a method for obtaining substantially quantitative recovery of selected higher molecular weight constituents of a gaseous mixture of hydrocarbons.

A futher object is to provide a method and apparatus for separating hydrocarbon gases wherein the residual gas will be satisfactorily dehydrated for transportation in pipe lines or the like.

Still another object is to provide a method and apparatus for separating heavy constituents from a hydrocarbon gas wherein the refrigeration requirement does not greatly exceed the latent heat of the liquid product.

A still further object is to provide a process for separating the heavy constituents from a hydrocarbon gas over a wide range of recovery, that is, from a recovery of ethane and heavier hydrocarbons to butanes and heavier hydrocarbons.

Yet another object of this invention is to provide a method and apparatus for separating the heavier from the lighter constituents of the gaseous mixture such as a natural gas by low temperature fractionation, which method and apparatus will require less refrigeration than previously known methods and apparatus and will be of such nature as to lend itself readily to the use of a water avid liquid circulating through the system with the products being treated for the purpose of preventing the formation of hydrates and ice.

Even another object is to provide a method of separating desired constituents from a hydrocarbon gas which is so simple that it lends itself to unattended operation.

Other and further objects of the invention will appear from the description.

It is believed that the method and apparatus of this invention can best be described by reference to the accompanying drawings which constitute a part of the instant specification, are to be read in conjunction therewith, and wherein like reference numerals are used to indicate like parts in the various views.

Figure 1:
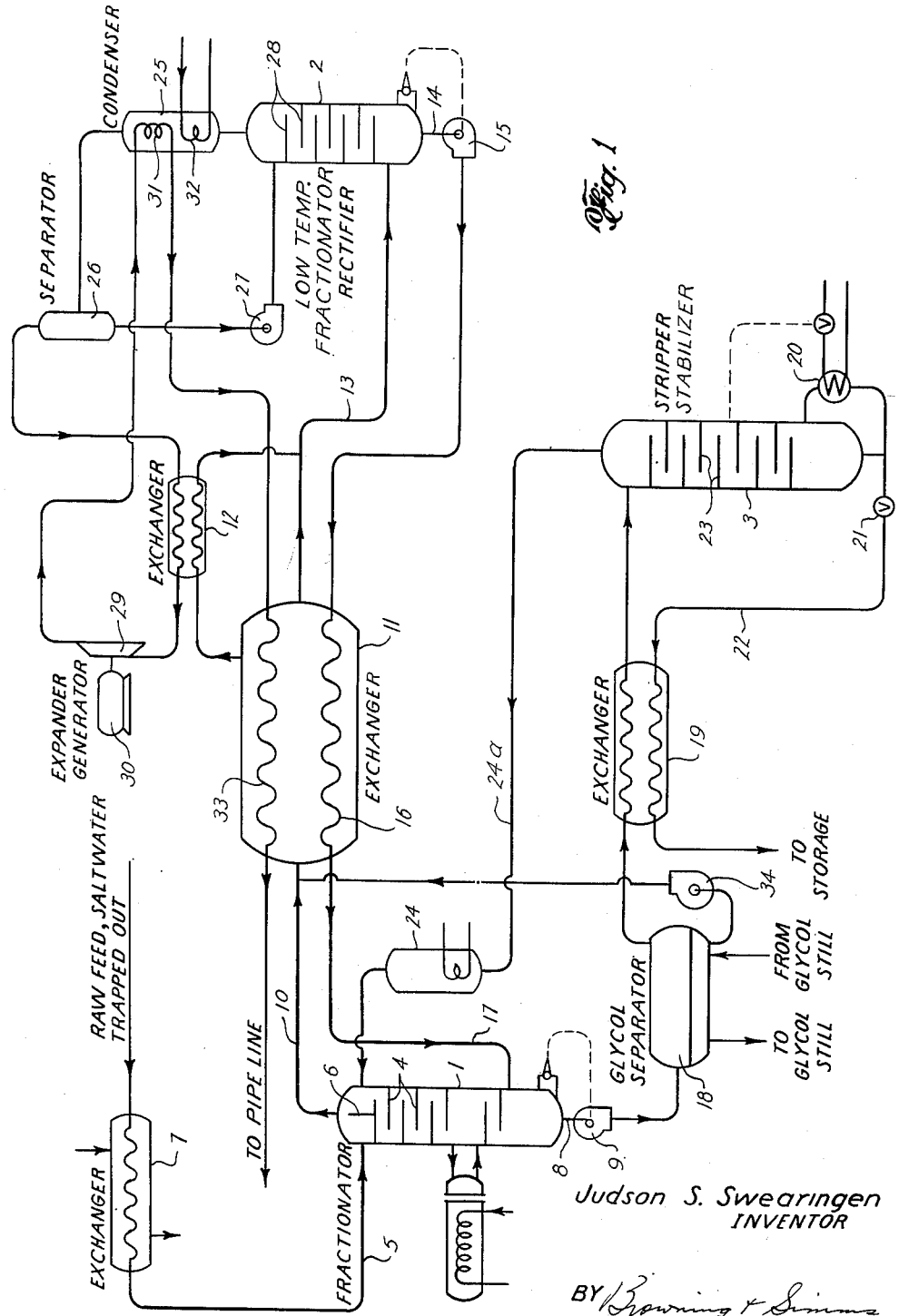
Figure 1 is a schematic flow diagram of an installation embodying this invention.

The method and apparatus in broad perspective are similar to those of a simple fractionating tower equipped with a reboiler at the bottom and a reflux condenser at the top. A stabilized liquid would be removed at the bottom and a residual vapor or gas would be taken from the top. However, if this simple fractionating tower were employed in a process for the removal of propane and heavier constituents from a hydrocarbon gas mixture such as natural gas containing ethane and heavier constituents, the refrigeration and heat requirements would be excessive because the overhead gas would be withdrawn and all reflux produced at approximately −65° F. Thus, it has been necessary to make certain variations and improvements in this simple scheme in order to conserve heat and refrigeration, the latter being especially expensive both in the consumption of power and in the cost of apparatus. To this end, the fractionating tower has been divided into three sections; namely, the fractionator 1, the rectifier 2 and the stripper 3, all operating at widely differing temperatures. Thus, the so-called fractionator 1 would operate at a temperature ordinarily not a great deal below that of the feed temperature to the plant while the rectifier 2 would operate at the extremely low temperature required for low temperature fractionation and rectification, and the stripper 3 would operate at a temperature substantially higher than that of the fractionator 1. By this arrangement, the apparatus and process lend themselves to the inclusion of certain heat exchange operations which materially reduce the heat and refrigeration requirements for carrying out the separation.

Referring to the fractionator 1 in which takes place one of the steps which contributes most materially to the desirable result achieved by this invention, it is made up of a tower having a plurality of trays 4 which may be of the form commonly known as bubble trays, providing for gas and liquid contact between rising vapor or gas and falling liquid streams. The plant feed stream of gaseous mixture to be treated enters the fractionator 1 adjacent the top through a line 5, and the liquid content thereof flows on to the uppermost tray of the tower, but on one side of a vertical baffle 6. If the plant feed stream has insufficient liquid constituents for the purposes of this invention as hereinafter described, additional condensate may be produced therein by first cooling the feed stream in a suitable heat exchanger 7. The bottom of the fractionator is equipped with a liquid discharge line 8 connecting with a pump 9, and the disposition of the liquid products removed from the fractonator by this pump will be hereinafter described.

The overhead from the fractionator, which will comprise all of the feed stream except that part which is liquid at the time the feed stream enters the fractionator, will be conducted from the top of the fractonator by a line 10 leading to a heater exchanger 11. As it leaves the fractionator this stream, as will be appreciated, will be at a temperature not far below that of the original feed stream, having been cooled only by such cooling as may be found necessary in the exchanger 7 in order to condense sufficient liquid for the purposes of use in the fractionator 1. In the heat exchanger 11, however, this stream will be greatly cooled until it reaches a temperature sufficiently low for the purpose of producing the desired low temperature fractionation and separation of the constituents of this stream. Part of the stream of mixture from the exchanger 11 may be passed through an auxiliary exchanger 12 for the purpose of balancing the heat loads in exchanger 11 by cooling a portion of the mixture stream, this stream having the higher heat capacity especially in the cold condition, and this portion of the mixture may then be conducted back to the main stream of the mixture flowing through the line 13 to the bottom of the rectifier 2. In the rectifier 2, that portion of the mixture which has condensed at the extremely low temperature at which the mixture is reduced in exchangers 11 and 12 will be drawn off through a line 14 by a pump 15 controlled by a float, and this stream of liquid is preferably then heated by passing it through the coil 16 of the heat exchanger 11 where it absorbs heat from the stream of mixture flowing toward the rectifier 2, and acquires a temperature which approaches within a few degrees of the temperature at which the fractionator 1 operates.

This raising of the temperature of the liquid stream from the rectifier 2 considerably increases its vapor pressure so that when it flows through the line 17 and empties into the lower end of the fractionator 1, a substantial amount of its lighter constituents will flash and pass off in the form of vapor or gas. This vapor or gas passing upwardly through and between the trays 6 of the fractionator will be intimately contacted with the downcoming liquid portion initially separated from the incoming feed stream. In the course of this contact, the rising vapors will tend to give up part of their heavier constituents which it is desired should be incorporated into the liquid product recovered from the process, these heavier constituents replacing some of the less desirable lighter constituents of the downcoming liquid initially separated from the feed stream so that such lighter constituents may pass upwardly through the fractionator and be mingled with the gaseous mixture flowing through the line 10 to the exchanger 11. Thus the evaporation energy of the undesired ethane is put to use in aiding the condensation of the propane.

By virtue of this gas and liquid contact and interchange of constituents in the fractionator 1, this invention avoids the recirculation of a great amount of the desired heavier constituents through the refrigeration stage provided in the exchanger 11 and the separation stage provided in the rectifier 2. Thus the requirements for refrigeration in the exchanger 11 are considerably reduced and it is made possible to employ a smaller capacity exchanger 11 and a smaller capacity rectifier 2 with less refrigeration capacity without overloading.

The stabilization step to which the liquid drawn from the fractionator 1 is subjected in the stripper 3 may be arranged to effect a still further saving in refrigeration. Thus, it will be seen that after this liquid product is drawn off (and where glycol is used as a dehydrating agent, the liquid passed through a glycol separator 18), it is passed through an exchanger 19 of conventional design and into the top of the stripper 3. In the heat exchanger 19, the temperature of this liquid is increased to a point considerably above the operating temperature of the fractionator 1 and in the stripper 3 the liquid is subjected to reboiling under the action of a heater 20. The hot heavier constituents in liquid form are drawn from the bottom of the stripper through a valve 21 and line 22 and passed through the heat exchanger 19 where they give up some of their heat in the preheating of the liquid going to the stripper.

The stripper 3 is provided with bubble trays 23 so that gas and vapor rising in this tower as a result of the reboiling will be intimately contacted with the downcoming liquid introduced from the heat exchanger 19 into the top of the stripper. This serves to take a considerable amount of the desirable liquid constituents out of the gas flowing overhead from the stripper.

This overhead gas from the stripper may now be run through a condenser 24 where it is cooled to very nearly the operating temperature of the fractionator in which condition it will have a considerable amount of condensed liquid entrained therein. This liquid may be saved and at the same time the necessity for refrigerating it and recirculating it through the rectifier 2 may be avoided by introducing it into the top of the fractionator 1 on the opposite side of the baffle 6 from the point at which the feed stream enters the fractionator. It is important that the stream from the stripper 3 be introduced into the fractionator at the same level as the original gas feed stream. The composition of the liquefied portion of the stream from the stripper 3 will be rich in the lighter, or lower boiling point portions of the liquid that is to be separated out of the main feed stream and should not be contacted with the vapor portion of the main feed stream. For this reason, it is preferably not introduced onto a tray of the fractionator 1 above the tray on which the main stream is introduced. Also, the vapor fraction of the stream from the stripper 3 which has passed through the condenser 24 will be rich in the heavier of the constituents which are not desired to be separated from the main feed stream and for this reason, should not be brought into appreciable contact with the liquid phase of the incoming feed stream. For this reason, it is preferable that the stream from the stripper 3 be not introduced onto a tray below that on which the main feed stream is introduced.

With these limitations in view, the two streams are introduced on the same tray but on opposite sides of the baffle 6 so that vapor both from the main feed stream and from the stream that comes overhead from the stripper will rise in the tower without any appreciable contact or co-mingling with the liquid portion of the other stream. The liquid phase of this stream from the stripper will flow downwardly through the fractionator 1 and be mixed with the downflowing liquid initially separated from the main feed stream and intimately contacted, along with that liquid, with the flash vapors arising from the bottom of the fractionator as hereinbefore described. The introduction of this additional amount of liquid out of the overhead stream from the stripper serves to still more perfectly extract from the flashed vapors rising from the bottom of the fractionator those constituents thereof which are desired to be separated out of the main feed stream and saved. As above mentioned, this avoids necessity for recirculation of these heavier desirable constituents and thus considerably reduces the amount of refrigeration necessary in carrying out the low temperature fractionation effected by the exchangers 11 and 12 in the rectifier 2.

The overhead vapors or gas from the low temperature fractionation will pass upwardly through the rectifier 2 and into a reflux condenser 25 where they will be subjected to refrigeration. From this condenser, this overhead mixture will flow to the reflux separator 26 from which the liquid reflux will be drawn by a pump 27 and injected into the upper end of the rectifier. This liquid reflux will flow down through the rectifier and in passing over and between the bubble trays 28 in the rectifier, it will be brought into intimate contact with the rising gas and vapor so as to absorb from such gas and vapor the heavier constituents carried therein.

The overhead gas from the separator, at a very low temperature which will be comparable to or lower than the temperature at which the rectifier 2 operates, will be caused to pass through the heat exchanger 12 where it will serve to refrigerate a portion of the gaseous mixture flowing toward the rectifier in the manner hereinbefore described. Passing through the exchanger 12 will raise the temperature of this gaseous mixture to some degree, but it will still be under relatively high pressure, whereupon it may be expanded, preferably by being caused to act upon a turbine 29 or other engine in which it will do mechanical work. In order that this mechanical work might not be again transformed into heat energy to cause raising of the temperature of the expanded gas, the work is preferably taken off mechanically and converted into some other form by any suitable means such as the generator 30.

The expanded and greatly cooled gas from the turbine 29 may now be employed for the purpose of refrigerating the condenser 25 by being forced through a coil 31 in that condenser. Additional refrigeration from some other suitable source may be added to the condenser 25 by means of a cooling coil 32, if such additional refrigeration is found necessary.

The still very cold gaseous mixture from the condenser coil 31 is then conducted to the heat exchanger 11 where it is caused to flow through a coil 33 for the purpose of supplying to the gaseous mixture approaching the rectifier sufficient refrigeration to bring that gaseous mixture down to the temperature at which the rectifier operates and which is necessary for the desired low temperature fractionation.

Upon emerging from the exchanger 11, the now gaseous mixture which will have been warmed in the exchanger 11 and which, in the entire process, will have had removed from it its heavier constituents, may be conducted to a pipe line, reinjected into a well, or even vented and flared whichever course seems most feasible economically.

It is to be noted that the process described is of such a nature as to lend itself most readily to the use of glycol as a dehydrating agent and as a means of preventing the formation of hydrates and ice at the low temperatures. As heretofore mentioned, the stream of liquid from the bottom of the fractionator 1 may be caused to flow through a glycol separator in which liquid glycol with its dissolved water may be separated from the liquid products flowing to the stripper. As the operation continues, glycol may be drawn from the separator and pumped by means of a pump 34 into the line 10 carrying the gaseous mixture from the fractionator 1 to the exchanger 11. Thus, the glycol is injected into the feed stream after the initial removal therefrom of the liquid content of the feed stream and before the feed stream has been cooled to any very low temperature. Being injected after the initial separation of the liquid from the feed stream, the glycol will not interfere with such separation nor cause any complications therein. On the other hand, it will be in the feed stream when the feed stream is first subjected to very low temperatures, and will be present at such temperatures to prevent the formation of ice and hydrates. Being injected at a point where the temperature is relatively high, it will have had an opportunity to dissolve the water content of the feed stream at such higher temperature before the refrigeration takes place.

The glycol then remains in the mixture during the entire time that it is at a low temperature and is separated out in the separator 18 only after the temperature of the mixture has again been raised.

The glycol in the circuit may be dehydrated as desired by removing from the separator continuously a desired fraction of the glycol, subjecting it to distillation or other well known process to remove the water, and reinjecting it into the separator. The water content of the glycol may be adjusted by this means to such content as may be most desirable. This will be determined, at least in part, by the water content of the feed stream because it is desirable that the glycol water ratio be so adjusted that the glycol-water solution will have a freezing point lower than any temperature contemplated anywhere in the process. This may be near the eutectic point and would be near such point for the lowest possible freezing temperature.

In describing the operation of the method and apparatus, it will be assumed that the problem to be dealt with comprises the separation of propane and heavier hydrocarbons from a natural gas. An ordinary example of a gas to be so treated would be a gas containing 83.15% methane, 7.84% ethane, 4.03% propane, 2.01% butanes, 0.70% pentanes and 2.27% hexanes and heavier. It will be assumed that the propane and heavier hydrocarbons will be separated as a liquid product from a feed stream initially at a pressure of 500 p. s. i. and at a temperature of 100° F. The feed stream will be cooled in the exchanger 7 and will enter the fractionator at approximately 40° F.

The partially condensed feed stream enters on the top tray of the fractionator 1. The liquid portion of the stream from the stripper 3 enters on the same tray but on the opposite side of the baffle 6. Thus, the liquefied portion of either of the two streams will not come in contact with the vapor portion of the other one of the streams, but liquids will merge together as the two streams pass downwardly through the fractionator. This liquid passing downwardly through the bubble trays 4 will exchange part of its dissolved ethane and methane for the propane and heavy constituents of the upcoming vapor in the tower. This prevents an excessive amount of propane from flowing upwardly into the heat exchanger 11 and the rectifier 2 of the system. This is important because any propane or heavy constituent leaving the top of the fractionator 1 must be brought back to the fractionator from the rectifier, and this represents an increase in the refrigeration requirement. Hence, the removal of the greatest possible amount of propane and heavier constituents from the upcoming vapor in the fractionator 1 serves to reduce substantially the refrigeration requirements of the process.

In addition, the exchange of ethane and methane in the downflowing liquid through the fractionator 1, reduces the contamination of the crude liquid or bottom product of the fractionator with methane and ethane, and thus reduces the volume of the vapor which must return from the stripper tower 3 to the fractionator. Thereby, an additional conservation of refrigeration is accomplished. Furthermore, the stream from the stripper 3 to the fractionator 1 carries some propane and heavier hydrocarbons, part of which would have to be recovered in the refrigerated section of the fractionating system if not taken out in the fractionator 1, and this would represent an additional refrigeration load in the reflux condenser 25 if it were allowed to escape again as fractionator overhead.

The stripper 3 may be considered to be the stabilizer of this fractionating system. It is in this tower that the crude liquid from the fractionator is stripped of dissolved ethane and methane. The crude feed stream entering the stripper from the exchanger 19 will be warmed to approximately 140° F. This allows recovery of the sensible cooling inherent in this temperature rise and also permits recovery of some latent cooling because the stream is partially vaporized. This conservation of refrigeration is a fortunate advantage of this invention.

The unvaporized portion of the stream approaching the stripper is sufficient to provide the reflux for the stripper so that no additional refrigeration is required for the top of this tower. This reflux liquid, passing downwardly through the stripper, dissolves out the propane and heavy hydrocarbons in the upflowing gas and releases any dissolved ethane and methane in the liquid. The heater 20 may be energized from any suitable heat source and may be a steam coil.

The vapor from the top of the stripper tower is cooled by refrigeration or other suitable means, in the condenser 24 to about 35° F. While the propane content of the stream from the stripper into the fractionator is about the same as that of the feed stream into the fractionator, the stream from the stripper is rich in ethane, and if it is contacted with the ethane-lean vapor of the initial feed stream, it would practically all evaporate; therefore, it must be introduced into the tower in such manner as not to cause contact between its liquid portion and the vapor portion from the incoming feed stream. If the stream into the fractionator 1 from the stripper were introduced at a lower tray than the incoming initial feed stream, the considerable quantity of vaporized ethane in the stream from the stripper would tend to strip from the liquid portion of the initial feed stream the propane therein. To avoid either of these situations, the two streams are introduced on the same tray of the fractionator 1 but on opposite sides of the baffle 6.

Figure 2:
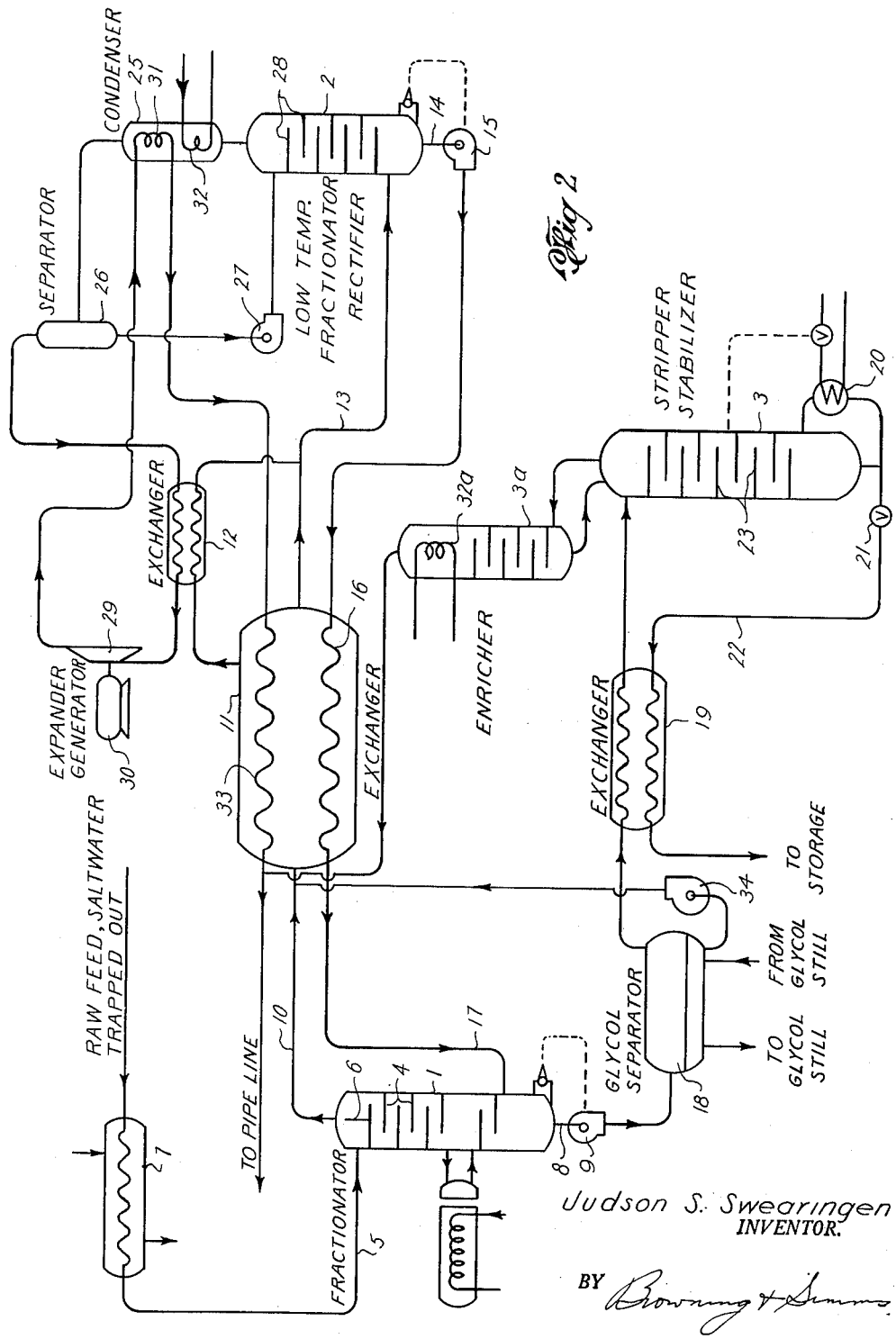
Figure 2 is a view similar to Figure 1 but showing a slight modification in the flow diagram.

In an alternate arrangement, shown in Figure 2 of the drawing, the partially condensed feed stream enters on the top tray of the fractionator 1 at approximately 80° F., and the liquefied portion thereof passes downwardly over the bubble trays 4 in countercurent contact with the upcoming vapor in the tower. Thus, propane and heavier in the vapor is absorbed by the liquid while the vapor strips out methane and ethane from the liquid as previously explained and for the purposes stated.

The stripper tower 3 in combination with the enriching tower 3a constitutes the stabilizer for the system. It is internally refluxed by external refrigeration in coils 32a, and the methane and ethane stream passes overhead and is combined with the residue gas stream to be delivered to the pipe line.

In this arrangement line 24a is not required. The only liquid passing down the fractionator 1 is the partial condensate from the feed stream, but it is sufficient since under this arrangement less gas flows up the fractionator because less feed to the stripper is required and therefore the stream in line 17 is smaller.

Referring now to the overhead from the fractionator, this stream will contain about 4% propane so there still must be a separation between the propane and ethane. These two constituents boil about 60° F. apart, so a simple fractionation to effect this separation would involve a large entropy gain and the refrigeration requirement would be excessive. In accordance with this invention, the overhead stream from the fractionator is cooled and partly condensed in the heat exchanger 11 and 12, thereby recovering a part of the refrigeration content of the returning streams of liquid and gas from the rectifier 2 and the condenser 25. This partial condensation is in fact equivalent to one stage of distillation or of fractionation. The liquid so condensed accumulates in the bottom of the rectifier 2 where it combines with the reflux from the rectifier and is returned by the pump 15 to the fractionator. This returned liquid is warmed in the heat exchanger 11 and is partially vaporized as it enters the bottom of the fractionator 1. This product was formed at about −40° F. or −50° F. and at such temperatures the propane is much less volatile than at the substantially 80° F. temperature prevailing in the fractionator 1. Therefore, the propane rich vaporized portion of this bottom product from the rectifier is advantageously contacted by the downflowing liquid in the fractionator which dissolves out part of the propane from the gas and causes the stripping from the liquid of some of its ethane and methane contents. Another advantage of this novel step is that the heat exchanger 11 reduces the refrigeration loss.

Turning now to the rectifier, the uncondensed portion of the fractionator overhead product passes upwardly in countercurrent contact with downflowing liquid originating in the condenser 25 and the separator 26. This reflux liquid is largely ethane from the separator 26 and serves to strip out the propane which may be contained in the rising vapors. The vaporous fraction from separator 26 is the residue gas containing the light constituents of the original hydrocarbon feed stream. The vaporous fraction from the separator 26 is at a very low temperature of about −70° F. and advantage is taken of this situation by causing it to flow through the heat exchanger 12 in countercurrent relation to a portion of the stream of mixture flowing to the rectifier 2 so as to assist in cooling such stream. This gas, then somewhat warmed to a temperature of about −35° F., but still at a pressure of approximately 500 p. s. i. may be expanded in a suitable means such as the turbine 29 so as to greatly reduce its temperature, bringing such temperature to approximately −110° F. Thereupon, it will be sufficiently cold so that it may be circulated through the coil 31 to provide a portion of the refrigeration for the condenser 25. Upon leaving the coil 31, this expanded gas, at a temperature of about −70° F., is still cold enough to supply a substantial amount of the refrigeration necessary to cool the feed stream to the rectifier 2 in the heat exchanger 11. Upon emerging from the heat exchanger 11, the residue gas will be at about 60° F., and at this elevated temperature may be conducted to a pipe line for transporting it to the point at which it may be disposed of in the most desirable fashion.

The following schedule illustrates the sharpness of the separation obtainable with the method and apparatus of this invention, particularly the form thereof illustrated in Figure 2. The data in the table below illustrates the separation obtainable upon a gas of the constituency above set forth wherein the propane and heavier hydrocarbons are separated as a liquid fraction from the gas.

Schedule A

| Components | Feed—to Fractionator at 80° F. | | Total Vapor from Fractionator | 72° F. Liquid from Fractionator | Bottom from Rectifier −40° F. | Rectifier Bottoms Entering Fractionator at 60° F. | |
|---|---|---|---|---|---|---|---|
| | Liquid | Vapor | | | | Liquid | Vapor |
| Methane | 0.82 | 82.33 | 90.73 | 2.16 | 9.74 | 1.19 | 8.55 |
| Ethane | 0.42 | 7.42 | 9.09 | 3.33 | 4.58 | 1.86 | 2.72 |
| Propane | 0.61 | 3.42 | 3.94 | 3.81 | 3.72 | 2.33 | 1.39 |
| Butanes | 0.75 | 1.26 | 1.33 | 2.01 | 1.33 | 1.20 | 0.13 |
| Pentanes | 0.46 | 0.24 | 0.25 | 0.70 | 0.25 | 0.23 | 0.02 |
| Hexanes | 1.94 | 0.33 | 0.36 | 2.27 | 0.36 | 0.33 | 0.03 |
| Total | 5.00 | 95.00 | 105.70 | 14.28 | 19.98 | 7.14 | 12.84 |

(Figures represent the mols of each consituent per 100 mols of feed.)

| Components | Gas Overhead Product 60° F. from Exchanger 11 | Bottom Product from Stripper 3 285° F. | 28° F. Overhead from Enricher 3a |
|---|---|---|---|
| Methane | 83.15 | 0 | 2.16 |
| Ethane | 7.80 | .04 | 3.29 |
| Propane | 0.42 | 3.61 | .20 |
| Butanes | 0 | 2.01 | 0 |
| Pentanes | 0 | 0.70 | 0 |
| Hexanes | 0 | 2.27 | 0 |
| Total | 91.37 | 8.63 | 5.65 |

(Figures represent the mols of each constituent per 100 mols of feed.)

It is believed that the objects of this invention have been accomplished. There has been provided an apparatus and method for separating selected heavy constituents of a mixture of hydrocarbon gases wherein the separation is sharp and economical. The arrangement is such that the gas streams which are to be cooled recover refrigeration from streams that may be warmed. The construction is such that a heat exchanger balance may be readily maintained throughout a wide range of feed gas compositions. The apparatus and process are so simple as to lend themselves to substantially automatic and unattended operation. The cut may be made between ethane and methane or between propane and butane or wherever desired. The system operates at a high refrigeration efficiency and where the feed stream is at a sufficiently high pressure, the energy of the stream itself may be utilized to provide the necessary refrigeration.

From the foregoing, it will be seen that this invention is one well adapted to attain all of the ends and objects hereinabove set forth together with other advantages which are obvious and which are inherent to the apparatus and process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a method of separating a gaseous hydrocarbon mixture into its heavier and lighter constituents, the steps of separating from said mixture a portion of its heavier constituents in liquid form, cooling, fractionating and rectifying at a lower temperature the remainder of said mixture to separate an additional portion thereof in liquid form, bringing said additional portion into heat exchange relation with the mixture approaching the last mentioned fractionating step to lower the temperature of the mixture and raise the temperature and vapor pressure of said additional portion, vaporizing a part of said additional portion, bringing the vapors from said vaporizing step into intimate contact with the liquid portion initially separated from said hydrocarbon mixture, and mixing and recirculating the vapors from said contact step with the gaseous mixture leaving said initial separation.

2. In a method of separating a gaseous hydrocarbon mixture into its heavier and lighter constituents, the steps of separating from said mixture a portion of its heavier constituents in liquid form, cooling, fractionating and rectifying at a lower temperature the remainder of said mixture to separate an additional portion thereof in liquid form, bringing the gaseous residue of said mixture into heat exchange relation with a portion of the mixture approaching said last mentioned fractionating step to assist in cooling the mixture, expanding said gaseous residue while allowing it to do mechanical work to lower its temperature, bringing the thus expanded residue into heat exchange relation with the mixture approaching the last mentioned fractionating step, bringing the additional liquid portion separated in the fractionating step into heat exchange relation with the mixture approaching the fractionating step to lower the temperature of the mixture and raise the temperature and vapor pressure of said additional portion, vaporizing a part of said additional portion, bringing the vapors from said vaporizing step into intimate contact with the liquid portion initially separated from said hydrocarbon mixture, and mixing and recirculating the vapors from said contact step with the gaseous mixture leaving said initial separation step.

3. In a method of separating a gaseous hydrocarbon mixture into its heavier and lighter constituents, the steps of separating from said mixture a portion of its heavier constituents in liquid form, injecting a water avid low freezing point liquid into a stream comprising the remainder of said mixture leaving the initial separation step, cooling, fractionating and rectifying at a lower temperature said remainder of said mixture including said water avid liquid to separate therefrom an additional portion in liquid form including said water avid liquid and dissolved water, bringing said additional portion including said water avid liquid and dissolved water into heat exchange relation with the mixture approaching the last mentioned fractionating step to lower the temperature of the mixture and to raise the temperature and vapor pressure of said additional portion, vaporizing a part of said additional portion, bringing the vapors from said vaporizing step into intimate contact with the liquid portion initially separated from said hydrocarbon mixture, mixing and recirculating the vapors from said contact step with the gaseous mixture leaving said initial separation step, and separating said water avid liquid with entrained water from the liquid drawn from said vaporizing step.

4. In a method of separating a gaseous hydrocarbon mixture into its heavier and lighter constituents, the steps of separating from said mixture a portion of its heavier constituents in liquid form, injecting a water avid low freezing point liquid into a stream comprising the remainder of said mixture leaving the initial separation step, cooling, fractionating and rectifying at a lower temperature said remainder of said mixture including said water avid liquid to separate therefrom an additional portion in liquid form including said water avid liquid and dissolved water, bringing said additional portion including said water avid liquid and dissolved water into heat exchange relation with the mixture approaching the last mentioned fractionating step to lower the temperature of the mixture and to raise the temperature and vapor pressure of said additional portion, vaporizing a part of said additional portion, bringing the vapors from said vaporizing step into intimate contact with the liquid portion initially separated from said hydrocarbon mixture, mixing and recirculating the vapors from said contact step with the gaseous mixture leaving said initial separation step, and separating said water avid liquid with entrained water from the liquid drawn from said vaporizing step, partially dehydrating said water avid liquid to such an extent that the water avid liquid taken with the water entrained therein after the dehydrating step and the water contained in the stream of mixture leaving the initial separation step will produce a solution whose freezing point will be lower than the lowest temperature to which the mixture is subjected in the cycle, and reinjecting the partially dehydrated water avid liquid into the stream of gases leaving the initial separation step.

5. In a method of separating a gaseous hydrocarbon mixture into its heavier and lighter constituents, the steps of separating from said mixture a portion of its heavier constituents in liquid form, cooling, fractionating and rectifying at a lower temperature the remainder of said mixture to separate an additional portion thereof in liquid form, bringing the gaseous residue of said mixture into heat exchange relation with a portion of the mixture approaching said last mentioned fractionating step to assist in cooling the mixture, bringing the additional liquid portion separated in the fractionating step into heat exchange relation with the mixture approaching the fractionating step to lower the temperature of the mixture and raise the temperature and vapor pressure of said additional portion, vaporizing a part of said additional portion, bringing the vapors from said vaporizing step into intimate contact with the liquid portion initially separated from said hydrocarbon mixture, and mixing and recirculating the vapors from said contact step with the gaseous mixture leaving said initial separation step.

6. In a method of separating a gaseous hydrocarbon mixture into its heavier and lighter constituents, the steps of separating from said mixture a portion of its heavier constituents in liquid form, cooling, fractionating and rectifying at a lower temperature the remainder of said mixture to separate an additional portion thereof in liquid form, expanding the gaseous residue of said mixture by allowing it to do mechanical work to lower its temperature, bringing the thus expanded residue into heat exchange relation with the mixture approaching the last mentioned fractionating step, bringing the additional liquid portion separated in the fractionating step into heat exchange relation with the mixture approaching the fractionating step to lower the temperature of the mixture and raising the temperature and vapor pressure of said additional portion, vaporizing a part of said additional portion, bringing the vapors from said vaporizing step into intimate contact with the liquid portion initially separated from said hydrocarbon mixture, mixing and recirculating the vapors from said contact step with the gaseous mixture leaving said initial separation step, and recovering the lighter hydrocarbon constituents from said initially separated liquid portion and from the liquid resulting from said vaporizing step.

7. In a method of separating a gaseous hydrocarbon mixture into its heavier and lighter constituents, the steps of separating from said mixture a portion of its heavier constituents in liquid form, cooling, fractionating and rectifying at a lower temperature the remainder of said mixture to separate an additional portion thereof in liquid form, bringing said additional portion into heat exchange relation with the mixture approaching the last mentioned fractionating step to lower the temperature of the mixture and raise the temperature and vapor pressure of said additional portion, vaporizing a part of said additional portion, bringing the vapors from said vaporizing step into intimate contact with the liquid portion initially separated from said hydrocarbon mixture, mixing the initially separated liquid portion and the liquid portion from said vaporizing step, stripping said mixed liquid portions at a temperature substantially greater than the temperature of said initial separation, partially condensing the vapors from said stripping step, and mixing the uncondensed vapors from said stripping step with the gaseous mixture leaving the initial separation step, and mixing the condensed portion of the vapors from said stripping step with the liquid from said initial separation step while the same is being brought into intimate contact with the vapors from said vaporizing step.

8. In a method of separating a gaseous hydrocarbon mixture into its heavier and lighter constituents, the steps of separating from said mixture a portion of its heavier constituents in liquid form, cooling, fractionating and rectifying at a lower temperature the remainder of said mixture to separate an additional portion thereof in liquid form, bringing said additional portion into heat exchange relation with the mixture approaching the last mentioned fractionating step to lower the temperature of the mixture and raise the temperature and vapor pressure of said additional portion, vaporizing a part of said additional portion, bringing the vapors from said vaporizing step into intimate contact with the liquid portion initially separated from said hydrocarbon mixture, mixing the last said liquid portion and the liquid portion from said vaporizing step, stripping said mixed liquid portions at a temperature substantially greater than the temperature of said initial separation, partially condensing the vapors from said stripping step, mixing the uncondensed vapors from said stripping step with the gaseous mixture leaving the initial separation step, and mixing the condensed portion of the vapors from said stripping step with the liquid from said initial separation step while the same is being brought into intimate contact with the vapors from said vaporizing step and mutually isolating the gaseous mixture leaving the initial separation step and the condensed portion of the vapors from said stripping step, and mutually isolating the uncondensed vapors from said stripping step and the liquid from said initial separation step.

9. In a method of separating a gaseous hydrocarbon mixture into its heavier and lighter constituents, the steps of separating from said mixture a portion of its heavier constituents in liquid form, cooling, fractionating and rectifying at a lower temperature the remainder of said mixture to separate an additional portion thereof in liquid form, bringing said additional portion into heat exchange relation with the mixture approaching the last mentioned fractionating step to lower the temperature of the mixture and raise the temperature and vapor pressure of said additional portion, vaporizing a part of said additional portion, bringing the vapors from said vaporizing step into intimate contact with the liquid portion initially separated from said hydrocarbon mixture, mixing the initially separated liquid portion and the liquid portion from said vaporizing step, stripping and enriching said mixed liquid portions at a temperature substantially greater than the temperature of said initial separation and discharging the gaseous residue from said stabilizing and enriching steps with the gaseous residue from said second fractionation step.

10. In a method of separating a gaseous hydrocarbon mixture into its heavier and lighter constituents, the steps of separating from said mixture a portion of its heavier constituents in liquid form, cooling, fractionating and rectifying at a lower temperature the remainder of said mixture to separate an additional portion thereof in liquid form, bringing said additional portion into heat exchange relation with the mixture approaching the last mentioned fractionating step to lower the temperature of the mixture and raise the vapor pressure of said additional portion, vaporizing a part of said additional portion at a pressure not less than that of the initial separating step, mixing the vapors from said vaporizing step with the gaseous mixture leaving said initial separation step at a point where the temperatures of said vapors and gaseous mixture are substantially the same, mixing the liquid from said vaporizing step with the liquid leaving said initial separation step, bringing into intimate contact with the initially separated liquid portion any vapors resulting from the mixing of the liquid portion leaving said vaporizing step, and mixing and recirculating the vapors from said contact with the gaseous mixture leaving said initial separation step.

JUDSON S. SWEARINGEN.

REFERENCES CITED

The following references are of record in the file of this patent:

UNITED STATES PATENTS

| Number | Name | Date |
|---|---|---|
| 1,946,580 | Gregory | Feb. 13, 1934 |
| 2,067,349 | Schuffan | Jan. 12, 1937 |
| 2,288,461 | Keith et al. | June 30, 1942 |